United States Patent [19]

Brog et al.

[11] Patent Number: 5,064,097
[45] Date of Patent: Nov. 12, 1991

[54] COMPACT WATER PURIFICATION AND BEVERAGE DISPENSING APPARATUS

[75] Inventors: Larry Brog, Mission Viejo, Calif; William H. Lichfield, Corinne, Utah

[73] Assignee: Water Center International Ltd., San Diego, Calif.

[21] Appl. No.: 595,260

[22] Filed: Oct. 10, 1990

[51] Int. Cl.$^5$ .............................................. B67D 3/00
[52] U.S. Cl. .................................. 222/129; 222/146.1
[58] Field of Search ................. 210/443, 262; 222/67, 222/108–110, 146.1, 23, 129, 129.3, 129.4, 132–135

[56] References Cited

U.S. PATENT DOCUMENTS

| | | |
|---|---|---|
| 3,456,803 | 7/1969 | Rak . |
| 3,578,126 | 5/1971 | Adams . |
| 3,698,603 | 10/1972 | Radcliffe . |
| 4,007,856 | 2/1977 | Murphey et al. . |
| 4,211,342 | 2/1978 | Jamqochian et al. . |
| 4,792,059 | 12/1988 | Kerner et al. . |
| 4,877,521 | 10/1989 | Petrucci et al. ..................... 210/443 |
| 4,880,535 | 11/1989 | Burrows ............................. 210/262 |

Primary Examiner—Frank Sever
Attorney, Agent, or Firm—Thorpe, North & Western

[57] ABSTRACT

A beverage dispensing apparatus which is compact and easy to use and maintain. The apparatus can dispense hot water, chilled water, carbonated water, a first mixed carbonated beverage, and a second mixed carbonated beverage at a single beverage dispensing station. The apparatus receives culinary water from an external source and includes structures for purifying the culinary water. All of the beverages dispensed from the apparatus utilize the purified water. The purified water is stored and chilled in a water holding tank. A carbon dioxide tank, a carbonation receptacle configured to carbonate water, and beverage concentrate receptacles holding soft drink syrups and the like, are all located in the chilled water so that the carbonated water and the beverage concentrates are chilled also.

38 Claims, 8 Drawing Sheets

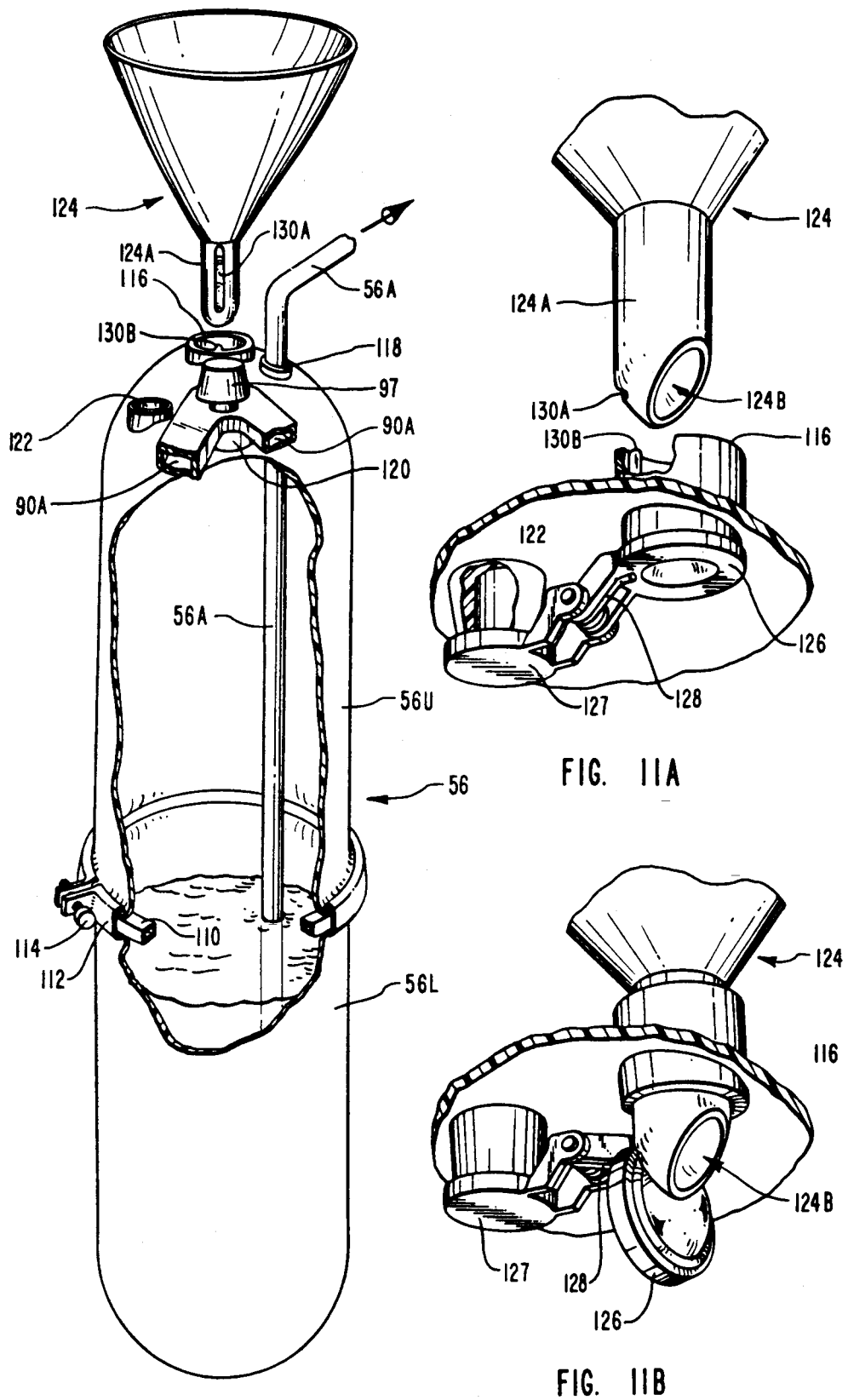

COMPACT WATER PURIFICATION AND BEVERAGE DISPENSING APPARATUS

BACKGROUND

1. The Field of the Invention

This invention relates to apparatus used to dispense beverages. More particularly, the present invention relates to devices which are used to treat water and/or to dispense a plurality of beverages.

2. The Prior Art

Consuming various types of beverages has become a common activity throughout the day in modern industrial societies. The consumption of bottled water, as well as mixed soft drinks such as carbonated soft drinks and plain and sparkling juices, has increased significantly over the past decade.

All kinds of beverages are now expected by the consumer, not just at a restaurant, but also at the work place and at home. Moreover, consumers have become generally more conscious about the healthfulness and purity of the beverages they consume. Whether it is straight water or a fruit juice, consumers now demand that the beverage not contain any undesirable matter.

In some cases, the purchase of bottled beverages can give the consumer at least a minimum amount of confidence in the purity of the beverage. Bottled beverages, however, are bulky, require a significant amount of refrigerator space, and are expensive. In order to avoid the high cost of dispensing bottled beverages, beverage dispensing apparatus have developed.

In the past, beverage dispensers have been limited to use in commercial applications, such as restaurants, due to the high capital cost, the bulky equipment required, and the knowledge and cumbersome procedures required to maintain and use the apparatus. In those applications where beverage dispensers are used, water available from the public culinary water supply has generally been used without any treatment or purification. In most cases, the general wisdom is that any undesirable tastes present in the culinary water will be masked by the flavoring added to the water. Significantly, consumers of beverages have recently come to expect better quality and purer beverages as well as pure straight water to drink.

The available beverage dispensing devices are ill adapted to small scale use. Thus, consumers of beverages have been unable to obtain a beverage dispensing apparatus for use in the home, office, recreational vehicle, boat, or other location where relatively small volumes, in comparison to a commercial restaurant, of one or more beverages would be dispensed.

With these difficulties in mind, it would be an advance in the art to provide a beverage dispensing apparatus which can reliably and efficiently dispense a variety of beverages from a compact apparatus and which includes structures to purify and chill culinary water and to prevent microorganisms from growing in the chilled, purified water. It would be another advance in the art to provide an apparatus to dispense a plurality of beverages which are mixed using only purified, chilled water. It would also be an advance in the art to provide a beverage dispensing apparatus which can dispense a variety of hot and cold beverages from a single beverage dispensing station which includes structures to chill both a holding tank full of water as well as a plurality of beverage concentrate containers.

It would also be an advance in the art to provide an apparatus for dispensing beverages which can be used in a variety of settings and which can be routinely serviced by the user who has not received any extraordinary training. It would be a further advance in the art to provide a beverage dispensing apparatus which dispenses the beverage to the user at the correct temperature without the need to include ice with the beverage.

BRIEF SUMMARY AND OBJECTS OF THE INVENTION

In view of the above described state of the art, the present invention seeks to realize the following objects and advantages.

It is a primary object of the present invention to provide a beverage dispensing apparatus which can reliably and efficiently dispense a variety of beverages in a compact apparatus.

It is also an object of the present invention to provide a beverage dispensing apparatus which includes structures to purify culinary water and prevent microorganisms from growing in the chilled, purified water and to dispense a plurality of beverages mixed using the purified water.

It is another object of the present invention to provide a beverage dispensing apparatus which can dispense a variety of hot and cold beverages from a single dispensing location.

It is still another object of the present invention to provide a beverage dispensing apparatus which includes structures to chill both a storage tank of water and a plurality of beverage concentrate containers.

It is also an object of the present invention to provide easily refillable beverage concentrate containers within a beverage dispensing apparatus.

It is yet another object of the present invention to provide a beverage dispensing apparatus wherein the beverage dispensed to the user is always at the correct temperature.

It is also an object of the present invention to provide an apparatus for dispensing beverages which is compact and which can be installed in any number of locations either as a stand-alone unit or a built-in unit.

It is a further object of the present invention to provide a beverage dispensing apparatus which retains beverage concentrates in a fresh state.

It is another object of the present invention to provide a beverage dispensing apparatus which can be routinely maintained by a user.

These and other objects and advantages of the invention will become more fully apparent from the description and claims which follow, or may be learned by the practice of the invention.

The preferred embodiments of present invention advantageously dispense a plurality of beverages from an easily maintained, operated, and compact apparatus. Included in some preferred embodiments are first means for dispensing hot water at a beverage dispensing station, second means for dispensing chilled water at the beverage dispensing station, and third means for dispensing carbonated water at the beverage dispensing station such that a user can immediately obtain hot, chilled, or carbonated water at the beverage dispensing station. Thus, the embodiments of the present invention provide the advantage of immediately dispensing hot, cold, and carbonated water all at the same beverage dispensing station.

Other embodiments of the present invention include fourth means for dispensing carbonated water at the beverage dispensing station and fifth means for dispensing carbonated water at the beverage dispensing station. Each of the fourth and fifth means for dispensing carbonated water comprises a beverage concentrate receptacle and means for mixing the beverage concentrate with carbonated water to dispense a mixed carbonated soft drink to the user.

The apparatus of the present invention may also include means for receiving culinary water from an external source and means for purifying the culinary water received from the external source. The means for purifying the culinary water supplies purified water for all of the beverages, both straight hot and straight cold water and hot and cold water mixed with a beverage concentrate.

An important feature of the present invention is the inclusion of a means for holding the water which has been purified. A means can also desirably be included for inhibiting the growth of microorganisms in the water which has already been purified.

The embodiments of the invention also comprises a means for chilling the water contained in the means for holding the water. Thus, a supply of purified, chilled water is ready to be dispensed to the user at all times. Advantageously, a carbonation receptacle and a plurality of beverage concentrate receptacles, which contain ready-to-dispense carbonated water and beverage concentrates, respectively, are placed in the chilled water so that the temperature of the carbonated water and the beverage concentrates is kept at the proper dispensing temperature. A means for communicating carbon dioxide gas present in the carbonation receptacle to the interior of the beverage concentrate receptacles is also provided.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 10 is a partially cutaway perspective view of the beverage concentrate receptacle of the described embodiment.

FIGS. 11A and 11B are detailed perspective views of the fill opening and fill funnel of the described embodiment.

DETAILED DESCRIPTION OF THE PREFERRED EMBODIMENTS

Reference will now be made to the drawings wherein like structures will be provided with like reference designations.

Figure 1:
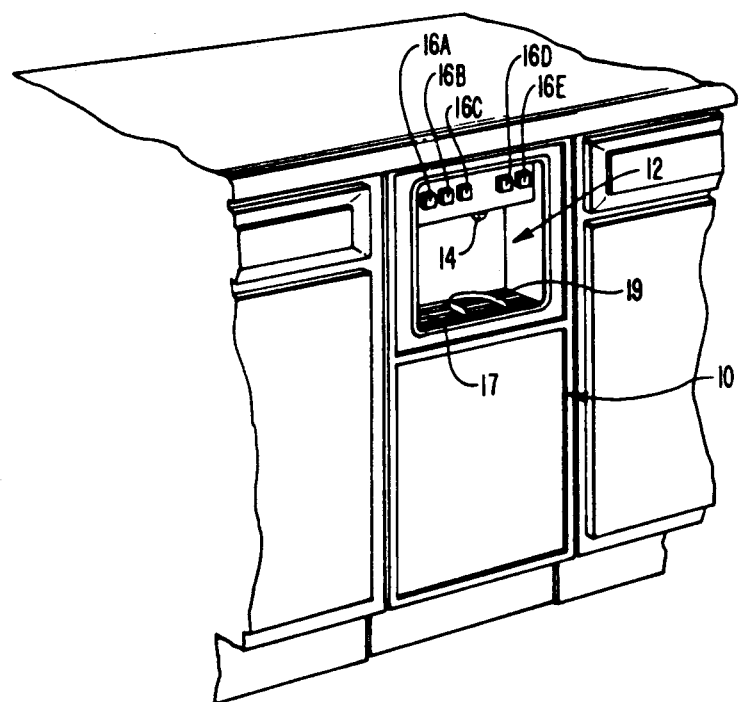
FIG. 1 is a perspective view of the presently preferred embodiment of the present invention in an installed configuration.

Represented in FIG. 1 is a perspective view of the presently preferred embodiment 10 of the present invention. The beverage dispensing apparatus 10 represented in FIG. 1 is configured as a built-in apparatus fitting under a counter top such as is usually found in residential kitchen settings.

With the increase in the demand by consumers of healthful beverages, the embodiments of the present invention will find application in numerous settings. The embodiments of the present invention can be configured as a stand-alone apparatus or can be adapted to be installed in a number of circumstances. For example, the apparatus of the present invention can be configured for installation in a work or business setting, in a residential setting, or even in mobile setting such as a motor home or a boat.

The described apparatus 10 is capable of dispensing several beverages from a beverage dispensing station 14, which in the described embodiment is a fill nozzle 14, positioned in a fill compartment generally designated at 12. The beverage dispensing apparatus 10 is configured to dispense any one of five beverages at the beverage dispensing station 14. After an examination of this disclosure, it will be understood that the term "beverage dispensing station" is not intended to refer to a single orifice, nozzle, or opening, but to a station from which a user can fill a container with one or more beverages without substantially moving the container. Thus, a beverage dispensing station will include a plurality of outlets, apertures, or the like, all of which empty into relatively the same area.

In order to dispense any one of the beverages, a user merely places a container, such as a cup (represented in FIG. 4 at 8), within a cup guide 18 and then actuates one of the five selection switches 16A–16E until the cup is filled. In order to improve the clarity of the drawings, the electrical connections between the switches 16A–16E and the other components of the beverage dispensing apparatus, as well as other electrical connections provided therein, have not been explicitly represented but those skilled in the pertinent art will be able to readily supply the necessary interconnections.

All of the water used in the dispensing operations of the described embodiment is purified water. Thus, pure water can be provided to the user without the expense and bother of bottled water. In order to purify water received from a public culinary water supply, several water purification devices are included in the illustrated embodiment of the invention.

Figure 2:
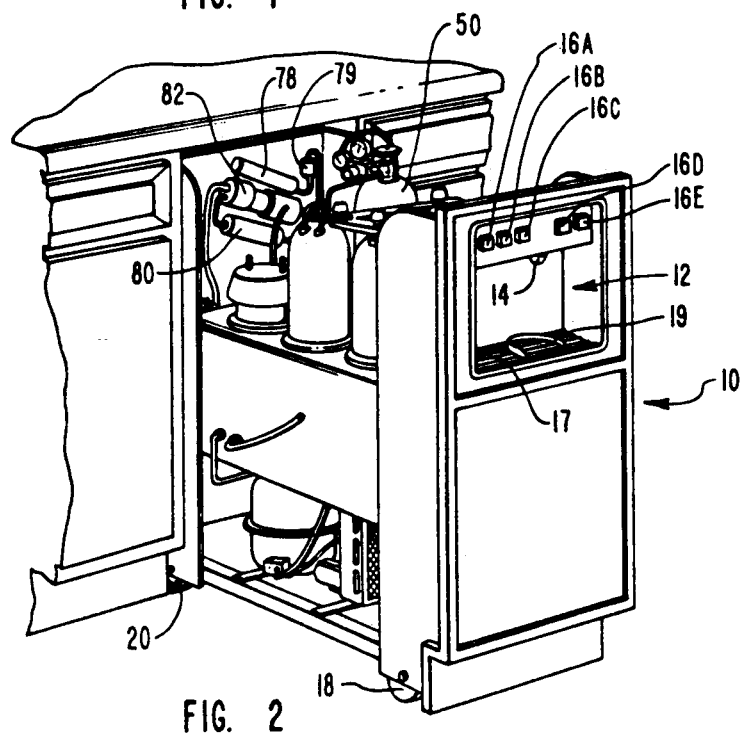
FIG. 2 is another perspective view of the embodiment represented in FIG. 1.

Represented in FIG. 2 are a sediment filter 78, a charcoal filter 80, and a reverse osmosis device 82, which function to purify all of the water which enters the apparatus 10. More information regarding these devices will be provided later in this disclosure in connection with FIG. 7.

Those skilled in the art will readily be able to fabricate components such as the frame, decorative panels, and other structures used in the described embodiment. Moreover, the components of the described apparatus must also be approved for use in food service applications as will be understood by those with experience in the industry.

The beverage dispensing apparatus of the present invention is much smaller than previously available devices which can provide a similar number of different beverages. In order to maintain such a compact size, the present invention utilizes a novel arrangement wherein a number of beverages are dispensed from a beverage dispensing station 14. For example, in the described apparatus, five beverages are dispensed from a single beverage dispensing station 14.

As represented in FIG. 2, the beverage dispensing apparatus 10 is compact and is provided with wheels 18 and wheel tracks (one of which is represented at 20) which allow the apparatus 10 to be rolled out from under the counter top. One of the great advantages of the present invention is the ease with which the apparatus 10 can be serviced. Thus, either a user or a hired service person can provide routine maintenance such as replacing a carbon dioxide tank, generally designated at 50, refilling one of the beverage concentrate receptacles, or performing other easily carried out operations.

Figure 3:
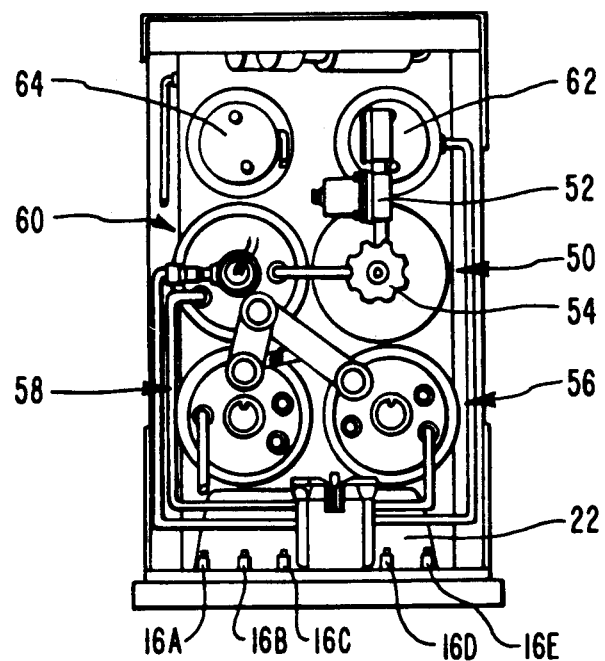
FIG. 3 is a top view of the described embodiment.

Referring next to the top plan view of FIG. 3, the carbon dioxide tank 50, with its shut off valve handle 54 and pressure regulator 52 is represented. Also represented in FIG. 3 is a carbonation receptacle 60 which serves to carbonate the water which will be dispensed to the user. FIG. 3 also shows a first beverage concentrate receptacle 58 and a second beverage concentrate receptacle 56.

Each of the beverage concentrate receptacles 58 and 56 holds a single beverage concentrate. Such concentrates can include soft drink syrups (for example, COCA COLA ® and 7-UP ®), fruit juices, or other flavoring concentrates. The beverage dispensing apparatus 10 described herein is configured to dispense carbonated water mixed with the beverage concentrates contained in the beverage concentrate receptacles 58 and 56. However, in accordance with the present invention, the beverage concentrates can also be dispensed with carbonated or uncarbonated water.

As will be readily appreciated by those dealing in the beverage dispensing arts, the materials used for the carbonation receptacle 60 and the beverage concentrate receptacles 56 and 58 must be approved for food service applications. Also, in order to increase the clarity of FIG. 3, some of the interconnecting hoses are only partially shown or are not represented in FIG. 3. Nevertheless, the necessary interconnections will be clear to a worker in the art after an examination of this disclosure and the means needed for conveying the liquids and gases used in the apparatus can be readily provided.

A gas transfer assembly, generally designated at 90, which functions to transfer carbon dioxide gas from the carbonation receptacle 60 to the beverage concentrate receptacles 58 and 56. Details concerning the gas transfer assembly 90, and the interconnection between the represented structures will be provided shortly in connection with FIG. 8.

Also represented in FIG. 3 are two (pumps 62 and 64) of the several pumps which are included in the described embodiment 10. The use of pumps has particular advantages as will be explained shortly. Also shown in FIG. 3 is a fill compartment housing 22 and a beverage dispensing head 66 which will be described in detail later in connection with FIG. 12. The beverage dispensing head 66 is the preferred example of a means for mixing a beverage concentrate with carbonated water.

Figure 4:
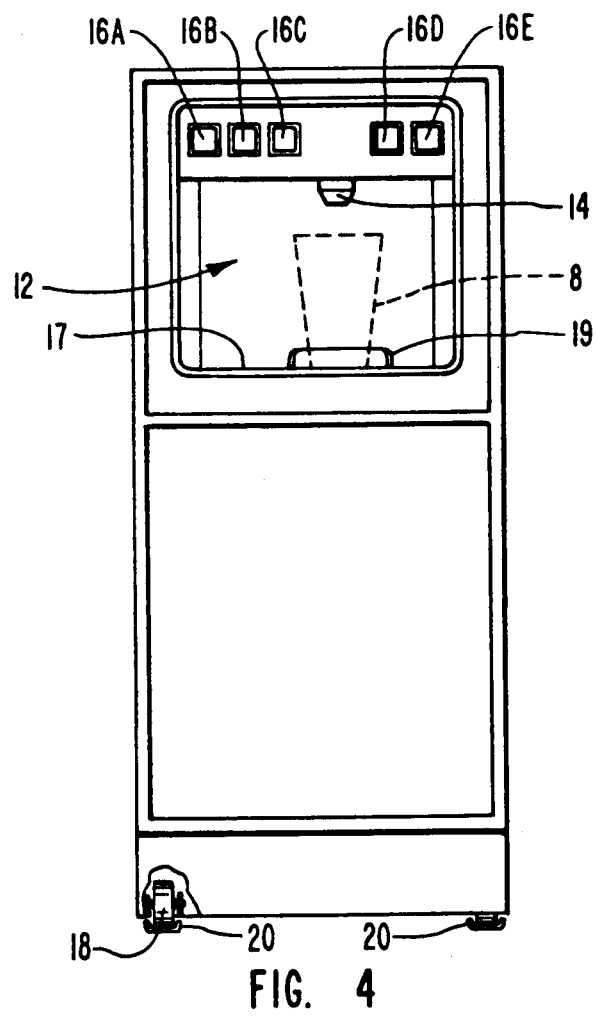
FIG. 4 is a front elevational view of the described embodiment.

Referring next to the front elevational view of FIG. 4, the five beverage selection switches 16A-16E are actuated to dispense any one of five beverages. In the illustrated embodiment, the following switches are used to dispense the indicated beverage: Beverage switch 16A—Carbonated water; Beverage switch 16B—Carbonated mixed beverage; Beverage switch 16C—Carbonated mixed beverage; Beverage switch 16D Cold water; Beverage Switch 16E—Hot water. A preferred example of a switch for use in the described embodiment is one available from Happ Controls, Inc. of Elk Grove, Illinois, Model No. 54-0004-3. In some embodiments of the present invention, a two position switch (not shown) can preferably be provided (connected to a double solenoid valve (not shown)) to allow the user to choose between dispensing flavored beverages mixed with either straight water or carbonated water.

In the described embodiment, only purified water is dispensed regardless of the whether it is mixed with a beverage concentrate or not. The present invention provides that purified water is always available to the user without the expense and bother of arranging for delivery of bottled water. Moreover, the advantage of obtaining better tasting mixed beverages is obtained. In the past, the taste of the beverage concentrate was counted on to mask any bad taste of the water obtained from the culinary water supply. Thus, the present invention provides the advantage of supplying purified water for dispensing both straight water beverages (hot and chilled water) and for mixing with beverage concentrates.

To dispense a beverage, a user merely places a cup or glass 8 (FIG. 4) within the cup guide 19 on top of a spill basin grill 17 and depresses a beverage dispensing switch 16A-16E until the cup is filled. It will be appreciated that it is within the scope of the present invention to include structures which are capable of dispensing more than five different beverages at one, or more, beverage dispensing stations.

Figure 5:
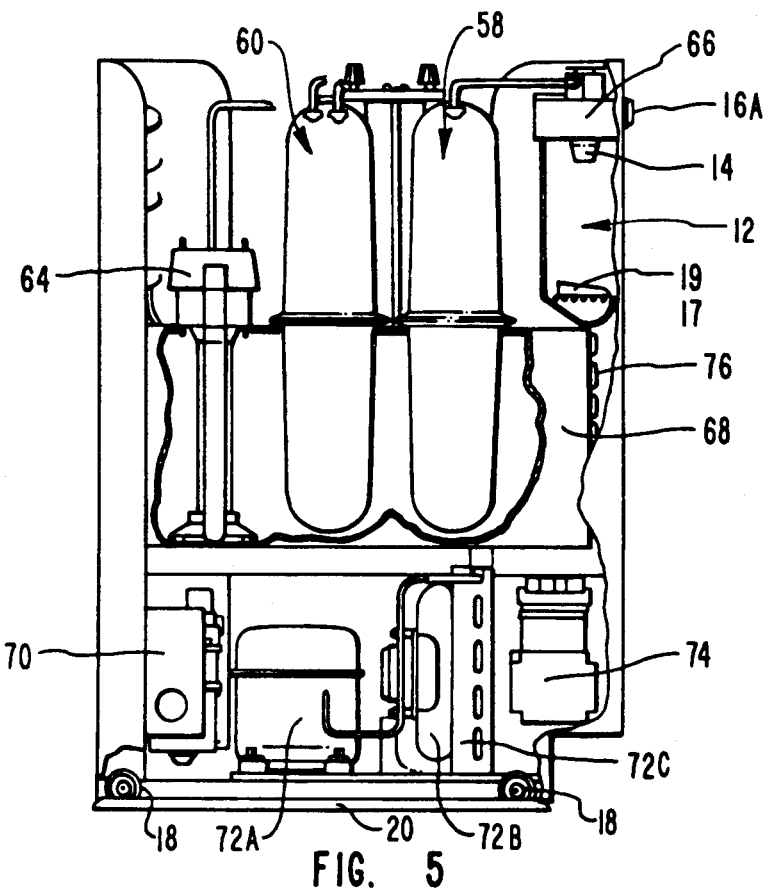
FIG. 5 is a right side elevational view of the described embodiment.

Reference will next be made to FIG. 5, which is a right side elevational view of the described embodiment, to point out some of the principal structures which are used to carry out the present invention. Importantly, water holding tank 68 receives water which has been purified by flowing through sediment filter 78, the charcoal filter 80, and the reverse osmosis device 82 (all represented in FIG. 2). The water holding tank 68 is generally enclosed on all sides so as to stop contaminants from entering therein. If desired, a bacterial filter can be placed over a vent (not shown in the drawings) provided on the water holding tank 68.

The sediment filter 78 which is preferred for use in the described embodiment is one available from Omnipure Filter Company of Caldwell, Idaho and referred to as the CL series. The charcoal filter 80 which is preferred for use in the described embodiment is also one availabe from Omnipure Filter Company of Caldwell, Idaho and referred to as the RO series. The reverse osmosis membrane included in the reverse osmosis device 82 can be obtained commercially and the housing can also be obtained from similar sources or readily fabricated by one skilled in the art.

As represented in FIG. 5, immediately adjacent to one end of the water holding tank 68 are refrigeration expansion coils 76 which, in cooperation with the other refrigeration components (a compressor 72A, a fan 72B, condensing coils 72C (mounted in a frame whose end in represented in FIGS. 5 and 6), and associated tubing and components known to those skilled in the refrigeration art) serve to keep the water contained in the water holding tank chilled, preferably at a temperature just above the freezing point of water. Preferred refrigeration components are available from the Copeland subsidiary of the Emerson Electric Co., Sidney, Ohio, Model No. MGBL-0013.

As can be seen in FIG. 5, the carbonation receptacle 60 and beverage concentrate receptacle 58 are at least partially submerged in the water holding tank 68. Thus, the contents of the carbonation receptacle 60 and the beverage concentrate receptacle 58 are kept at a temperature which is close to the temperature of the chilled water in the water holding tank 68.

Placing the carbonation receptacle 60 and the beverage concentrate receptacle 58 in the water holding tank provides several desirable advantages. Among these advantages are making the apparatus more compact than otherwise possible. Also, since the water purification system of the represented apparatus is of limited capacity, the water holding tank 68 provides an amount of purified, chilled water which can be immediately dispensed and then gradually replenished at a rate which can be accommodated by the water purifying system.

Also, in the case of the carbonation receptacle 60, keeping the water chilled and pure provides water which can be carbonated more easily and which retains its carbonation longer than water which is at room temperature. Importantly, carbonation can also be carried out at a lower pressure using water which has been chilled and which has had impurities removed therefrom. The represented carbonation receptacle 60 and the associated structures provide better carbonation than was possible in prior art apparatus.

In the case of the beverage concentrate receptacle 58, keeping the beverage concentrate at just above the freezing point of water prolongs the freshness of the concentrate. Significantly, keeping the beverage concentrate chilled allows beverage concentrates such as coffee and tea concentrates to be stored for later use. This is in contrast to the prior art practice of keeping the concentrate at room temperature. With the beverage concentrate kept chilled, concentrates which could not otherwise be used are preserved for long periods. Furthermore, the concentrate is kept at a desirable dispensing temperature so that further cooling (either with ice or refrigeration) is not necessary.

Also represented in FIG. 5 is a pump 64 which moves water from the water holding tank to the beverage dispensing head 66 so that pure, chilled water can be dispensed from the dispensing station upon the demand of the user. Desirably, the illustrated pump will allow any water remaining in the water line leading to the beverage mixing assembly to drain back into the water holding tank where it will remain at the chilled temperature. The hoses, tubes, or pipes used to convey water from the water holding tank 68 to other structures should be oriented to allow most, if not all, of any liquid not dispensed to drain back into the water holding tank 68. Also, the inner diameter of the hoses, tubes, or pipes, as well as the characteristics of the pumps, which are used should be chosen to allow this feature to be efficiently carried out.

A high pressure pump 74 is also provided to move water from the water holding tank 68 to the carbonation receptacle 60. The high pressure pump 74 is particularly adapted for forcing the water into the carbonation receptacle 60 where it is dispersed within the tank for best carbonation as will be explained shortly.

A combined hot water heater and hot water holding tank 70 is also provided. The hot water heater receives pure, chilled water from the water holding tank 68 and stores a relatively small amount of hot water its hot water holding tank 70. The hot water heater and hot water holding tank 70 are able to provide adequate hot water on the demand of the user. A preferred component which can be used in the hot water heater and hot water holding tank 70 is a 2000 watt sheathed heater element marketed under the Chromalox ® trademark by the Edwin L. Wiegand Division of Emerson Electric Co. Other hot water heater and hot water holding tank 70 components are available in the art or may be readily fabricated by those skilled in the art.

Figure 6:
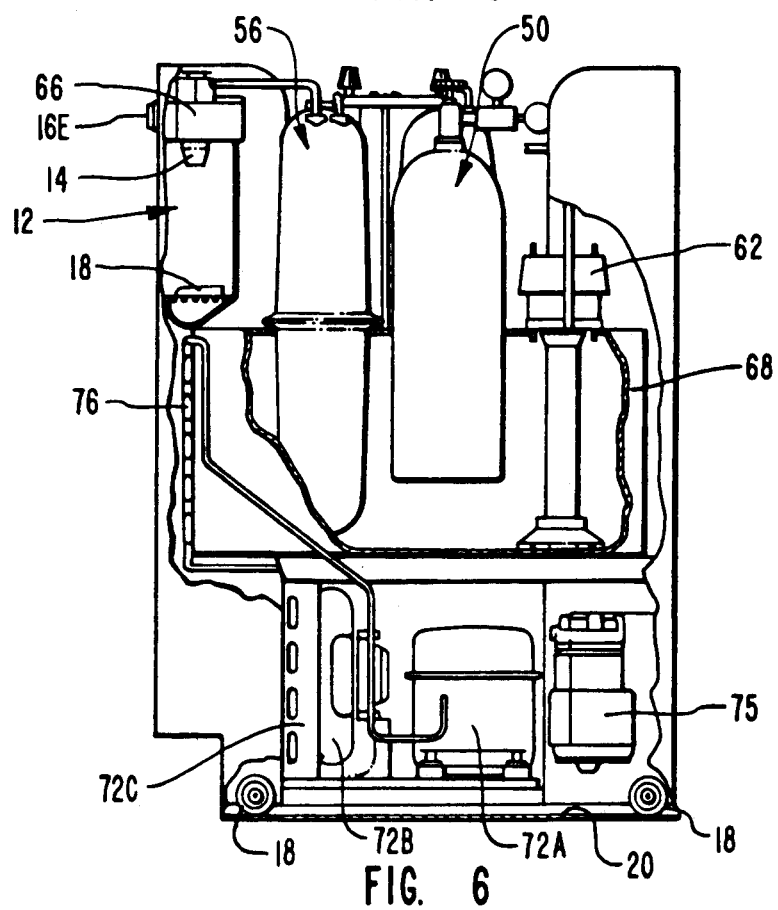
FIG. 6 is a left side elevational view of the described embodiment.

Represented in FIG. 6 is a pump 62 which moves the water from the water holding tank 68 to the hot water heater 70. Another pump 75 moves the water from the hot water heater 68 to the beverage dispensing station upon the demand of the user. By using separate pumps for moving water to the hot water heater 70 and from the hot water heater 70, an "open" (i.e., unpressurized) heating system can be used and the need for a pressure relief device is avoided. Also, any hot water which is not dispensed from the water line drains back into the hot water heater where it remains hot.

Referring still to FIG. 6, the carbon dioxide tank 50, as well as another beverage concentrate receptacle 56, is represented. Both the carbon dioxide tank 50 and the beverage concentrate receptacle 56 are partially submerged in the chilled water contained in the water holding tank 68. Keeping the beverage concentrate receptacle 56 submerged in the chilled water keeps their contents at a cool temperature ready to be dispensed. A preferred example of a carbon dioxide tank 50 is one of seamless aluminum and available from Luxfer USA Limited of Riverside, California.

Figure 7:
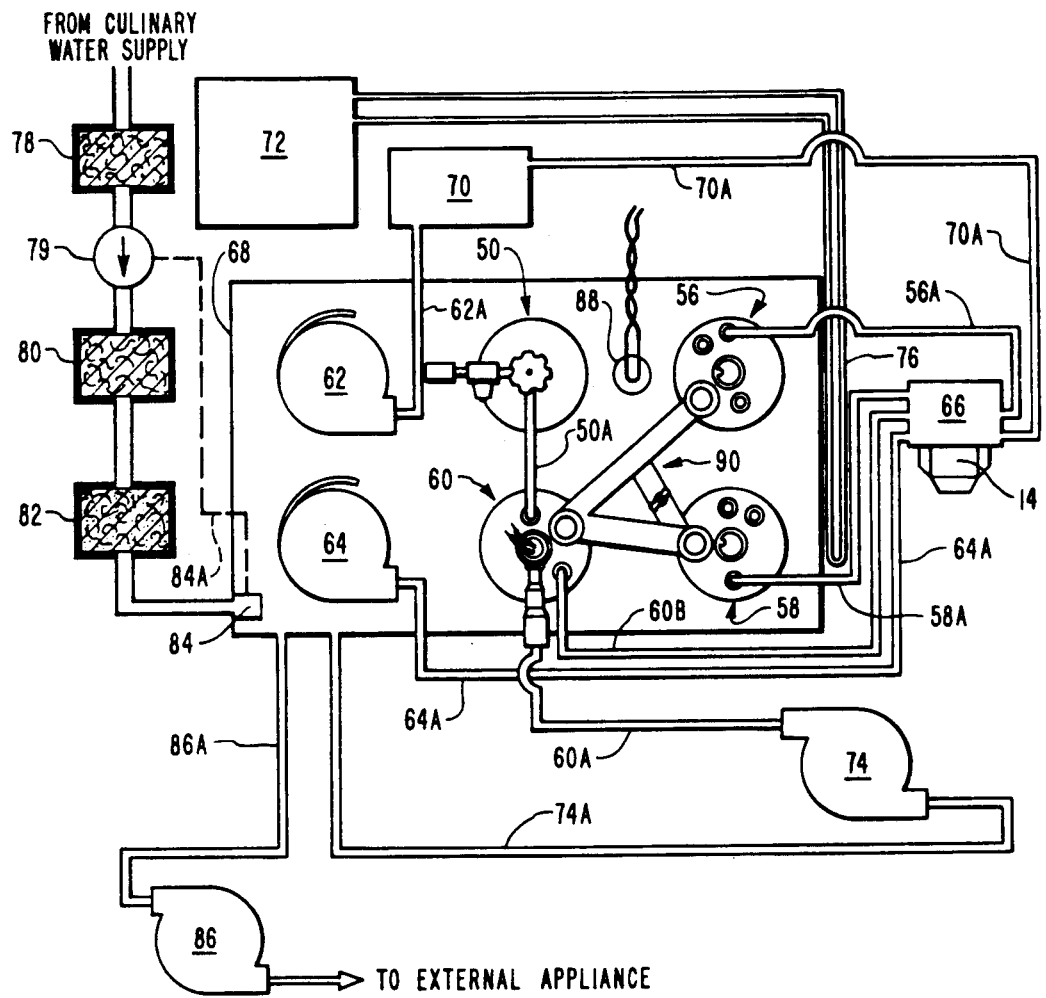
FIG. 7 is a schematic representation of some of the principal components included in the described embodiment.

Reference will next be made to FIG. 7 which is a schematic representation of principal components included in the described embodiment. As indicated earlier, the described embodiment is intended to obtain its supply of water from a culinary water supply as indicated in FIG. 7. Other sources of water can also be utilized within the scope of the present invention.

Since all the water dispensed (both straight and mixed with a beverage concentrate) is purified water, all the water entering the apparatus is treated by the three water purification devices represented in FIG. 7. These water purification devices include the sediment filter 78 which is placed first in the series of water purification devices. By placing the sediment filter 78 first in the series, any coarse material that might tend to clog or impair the operation of the later devices of the apparatus is removed.

A solenoid valve 79 is positioned next in the water flow. The solenoid valve is operated by a water level detection sensor 84 (which produces a control signal conveyed by line 84A) which causes the solenoid valve 79 to open when the water level in the water holding tank is low and to close when the water level in the water holding tank 68 has reached the proper level.

The charcoal filter 80 is positioned next in the water flow. The charcoal filter 80 removes undesirable tastes and odors from the water. Finally, the water is treated by the reverse osmosis device 82 which removes the remaining impurities and minerals from the water. Removal of the minerals from the water reduces the maintenance needs and prolongs the life of various components in the apparatus by reducing mineral deposits. The waste liquid from the reverse osmosis device is discarded into a drain (not represented in the figures) or it can be collected and removed occasionally, or, in the alternative, evaporated.

After it has been purified, the water enters the water holding tank 68 where it is chilled and will be used to supply all the water dispensing functions of the apparatus. Having been subjected to the purification process, the water will be relatively free from undesirable microorganisms, chemicals, and minerals. Moreover, the low temperature of the water will inhibit growth of any microorganisms. Still, since the water may remain in the water holding tank for anywhere from just a few minutes to several months, accommodation must be made to reduce microorganism growth to a minimum.

In order to actively kill any microorganisms present in the water, an ultraviolet lamp 88 is immersed in the water. The ultraviolet lamp 88 can operate continuously or intermittently to kill microorganisms depending upon the condition of the water. Moreover, the ultraviolet lamp 88 is preferably positioned within the water holding tank 68 where water will circulate by the ultraviolet lamp 88, for example, by the pumps 62 and 64.

The pump 64 moves chilled water from the water holding tank 68 through a water line 64A to the beverage dispensing head 66. The pump 62 moves chilled water from the water holding tank 68 through a water line 62A to the hot water heater 70. From the hot water heater 70, a water line 70A conveys the heated water to the beverage dispensing head 66.

The components of the refrigeration system of the illustrated apparatus described earlier in FIGS. 5 and 6 are represented at 72 in FIG. 7. An auxiliary pump 86 is also provided to remove purified water from the water holding tank 68 by way of water line 86A to an external appliance (not represented in the figures). Examples of external appliances which might use the water supplied by the pump 86 are an ice maker (located in a freezer or free standing) or other appliance requiring a supply of cold or pure water.

The high pressure pump 74 receives pure, chilled water from the water holding tank 68 by way of a water line 74A. The water is feed under pressure into the carbonation receptacle 60 by way of water line 60A. Carbon dioxide gas from the carbon dioxide tank 50 is continually feed into the carbonation receptacle 60. A double check valve 98A connected between the high pressure pump 74 and the carbonation receptacle 60 prevents the escape of water or gas back through the high pressure pump 74.

The operation of the high pressure pump 74 is controlled, as will be explained shortly, to keep the level of purified, chilled water within carbonation receptacle 60 at a constant level and at a high enough level that the amount of carbonated water can meet the user's demands. Nevertheless, the carbonation system of the described apparatus is efficient enough to maintain a steady supply of adequately carbonated water.

The carbonated water is removed from the carbonation receptacle 60 through carbonated water line 60B and conveyed to the beverage dispensing head 66 where it is released to the user at the beverage dispensing station 14. The carbonated water is forced out of the carbonation receptacle 60 by the pressure of the carbon dioxide gas contained therein and released at the beverage dispensing station 14 by the action of a solenoid valve (not explicitly represented in FIG. 7) integrally associated with the beverage dispensing head 66.

The carbon dioxide gas present in the carbonation receptacle 60 is transferred to both of the beverage concentrate receptacles 56 and 58 by way of a gas transfer assembly, generally indicated at 90 in FIG. 7. The gas transfer assembly 90 includes internal channels and connections (which will be described in detail shortly) that transfer the carbon dioxide gas under pressure from the carbonation receptacle 60 to each of the beverage concentrate receptacles 56.

The gas transfer assembly 90 is held in place by a rod 92 attached to the top of water holding tank 68 and a nut 94. The gas transfer assembly 90 also serves to hold the carbonation receptacle 60 and the beverage concentrate receptacles 56 and 58 down in the water holding tank 68.

The carbon dioxide gas pressure transferred to the beverage concentrate receptacles 56 and 58 maintains a constant pressure on the liquid contained in the beverage concentrate receptacles 56 and 58. In this way, beverage concentrate is continually being forced from beverage concentrate receptacles 56 and 58 through beverage concentrate lines 56A and 58A, respectively, to the beverage dispensing head 66. As with the carbonated water, actuation by a user of the proper beverage selection switch (16A-16E in FIG. 4) will operate the appropriate solenoid on the beverage dispensing head 66 causing the proper beverage concentrate to be released at the beverage dispensing station 14 along with carbonated water.

Figure 8:
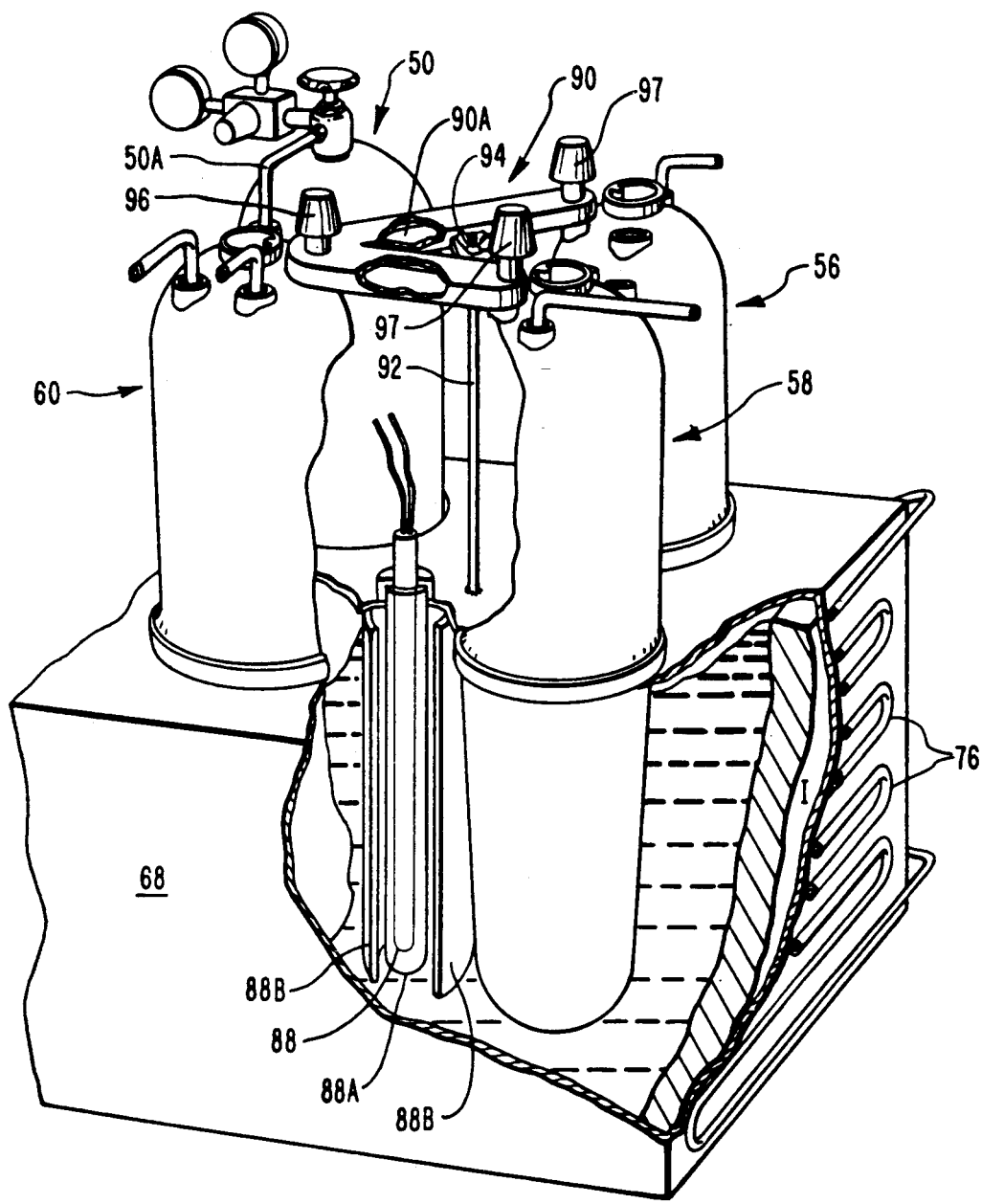
FIG. 8 is a partially cutaway perspective view of the water holding tank and the receptacles placed therein.

Reference will next be made to FIG. 8 which provides a more detailed, partially cutaway perspective view of the water holding tank 68 and the receptacles placed therein. The water holding tank 68 is illustrated in its preferred rectangular configuration having four sides, a bottom, and a top. The expansion coils 76 are represented as being immediately adjacent to one side of the water holding tank 68. While not represented in the drawings, those skilled in the art will appreciate that it is desirable to place insulation around the expansion coils 76 and the water holding tank 68. Significantly, since the carbonation receptacle 60 and the beverage concentrate receptacles 56 and 58 are kept in the water holding tank 68, these structures do not need their own insulation which results in further space savings and a more compact beverage dispensing apparatus.

Also represented in FIG. 8 is an ice bank I formed on the inner side of the water holding tank 68 opposite from the expansion coils 76. It is generally desirable for most efficient operation to operate the refrigeration components so that an ice bank forms and is generally maintained within the water holding tank 68.

The ultraviolet lamp 88 is also represented in FIG. 8. To prevent damage to, and to extend the life of, the ultraviolet lamp 88, the ultraviolet lamp 88 is placed in an enclosure 88A, which is preferably fabricated from clear Teflon ®. Since constant exposure to ultraviolet radiation can breakdown the materials which are used to fabricate the carbonation receptacle 60 and the beverage concentrate receptacles 56 and 58, an opaque shield 88B is provided.

FIG. 8 also provides a more detailed view of the gas transfer assembly 90. As represented in the broken away portion of the gas transfer assembly 90, a gas channel 90A is provided to transfer carbon dioxide gas between the carbonation receptacle 60 and the beverage concentrate receptacles 56 and 58 in order to provide the pressure to force the beverage concentrate to the beverage dispensing head 66 (FIG. 7) and to prolong the freshness and longevity of the beverage concentrate.

Those skilled in the art will understand that during the carbonation of water, oxygen molecules are released and will collect in the carbonation receptacle 60 and also be transferred to the beverage concentrate receptacles 56 and 58 via the gas transfer assembly 90. While the collection of oxygen is undesirable, it will have limited effect on the beverage concentrates held in the beverage concentrate receptacles 56 and 58 because the heavier carbon dioxide gas will settle to the surface of the beverage concentrate thus protecting the beverage concentrate from the effects of the oxygen. Also, the oxygen will be periodically released when the beverage concentrate receptacles 56 and 58 are opened at their tops to add more beverage concentrate as will be explained in connection with FIGS. 11A and 11B.

The gas transfer assembly 90 also is provided with a pressure relief valve 96 and two pressure relief and gas shut off valves 97. The pressure relief valve 96 functions to release the pressure within the carbonation receptacle 60 if the pressure exceeds a predetermined safe limit. Each of the pressure relief and gas shut off valves 97 has two positions, a first position which opens the gas channel 90A to the interior of the beverage concentrate receptacles 56 and 58 (the normal position) and a second position which disconnects the gas channel 90A from the interior of the beverage concentrate receptacles 56 and 58. In the second position, the pressure relief and gas shut off valves 97 also release any gas contained under pressure in the beverage concentrate receptacles 56 and 58 so that a user can open the beverage concentrate receptacles 56 or 58 to refill them with a beverage concentrate. The structures used to refill the beverage concentrate receptacles 56 and 58 will be explained shortly.

Figure 9:
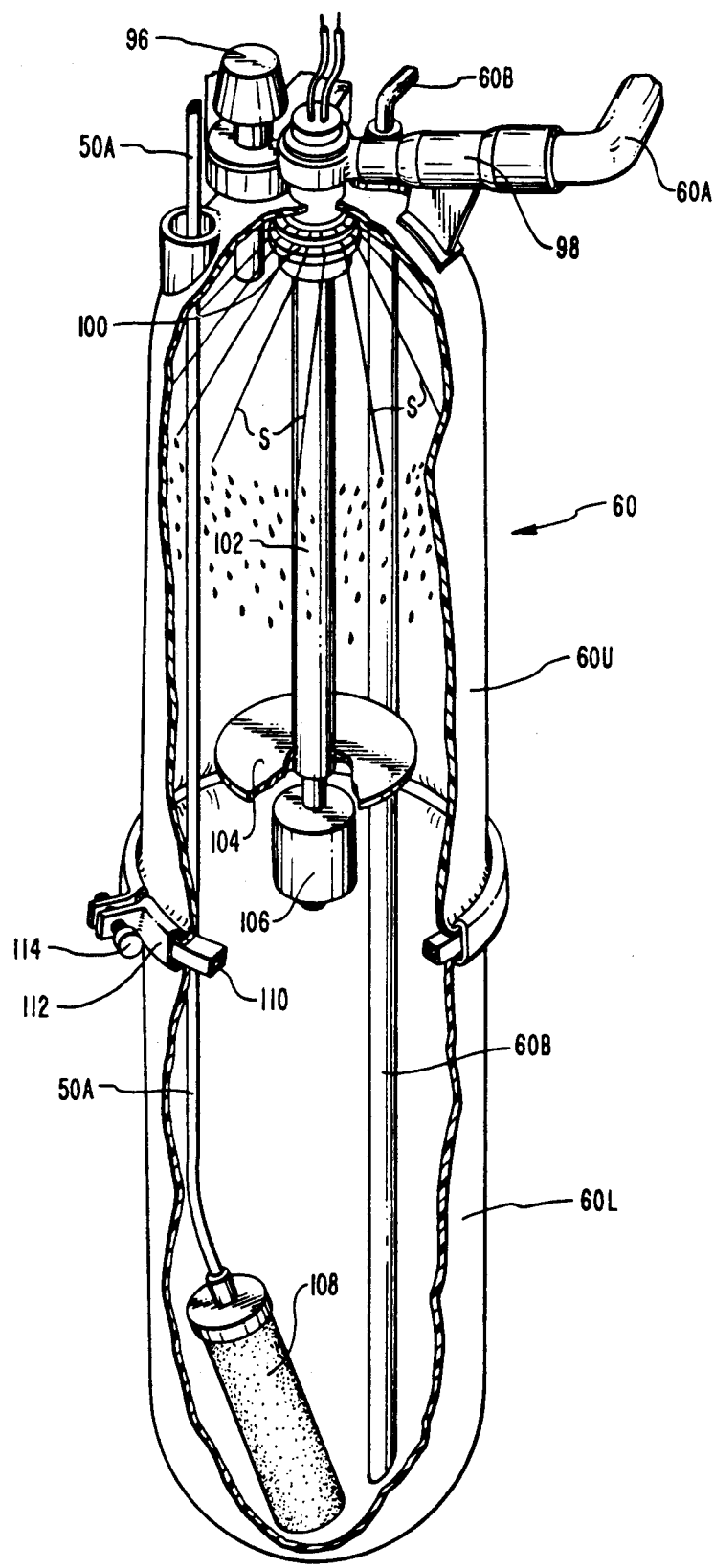
FIG. 9 is a partially cutaway perspective view of the carbonation receptacle of the described embodiment.

Reference will next be made to FIG. 9 which is a partially cutaway perspective view of the carbonation receptacle 60 of the represented embodiment. Advantageously, each of the shells of the receptacles (the carbonation receptacle 60 and the beverage concentrate receptacles 56 and 60) are identically configured. Thus, the receptacles can be used as a beverage concentrate receptacle or a carbonation receptacle depending upon the structures associated therewith.

The carbonation receptacle 60 includes an upper shell 60U and a lower shell 60L. The upper shell 60L and the lower shell 60L are joined by a clamp 112 which is tightened by a bolt 114. The clamp 112 compresses the upper shell 60U and the lower shell 60L onto a resilient O ring 110. Desirably, the O ring 110 acts as an over pressure relief device. If for any reason, pressure relief valve 96 or the pressure relief and gas shut off valves 97 fail, and the pressure within the carbonation receptacle 60 (or the beverage concentrate receptacles 56 or 58) exceeds a safe limit, the excess pressure will escape past the O ring 110 prior to any rupturing of the carbonation receptacle 60 or the beverage concentrate receptacles 56 and 58.

Purified, chilled water is fed into the carbonation receptacle 60 from the water line 60A and through a double check valve 98. The double check valve 98 ensures that water will not travel from the interior of the carbonation receptacle 60 back into the water line 60A leading to the water holding tank 68.

As the purified, chilled water enters the carbonation receptacle 60, it passes through a dispersor 100 where the water flow is directed into a sheet-like pattern (S in FIG. 9) which is broken up into droplets as the sheets hit the inner wall of the carbonation receptacle 60 which facilitates the carbonation of the water. Carbon dioxide gas enters the carbonation receptacle 60 through the gas line 50A which delivers it to a porous stone 108 as is known in the art and which functions to break the carbon dioxide gas flow into numerous small bubbles.

The water level within the carbonation receptacle 60 is maintained at about the half full level and is controlled by a level sensor 106 which detects the when the water level has reached the level sensor 106. The level sensor is preferably one available from Imo Industries Inc., Gems Sensors Division, of Plainville, Connecticut included in the "LS" series. The level sensor 106 is held in position on a shaft 102. The level sensor 106 controls the operation of the high pressure pump 74 by way of a control signal conveyed by the wires exiting the top of the carbonation receptacle. A preferred pump, Model FloJet ™ 2030-527/528, available from the FloJet Corporation of Irvine, California.

Carbonated water exits the carbonation receptacle 60 through carbonated water line 60B. A disc 104 is provided on the lower end of the shaft 102 to prevent gas line 50A and carbonated water line 60B from interfering with the operation of the level sensor 106.

With the carbonation receptacle 60 partially submerged in the chilled water contained in the water holding tank 68, the illustrated carbonation system provides more efficient operation, due to the lower temperature and purity of the water and other characteristics of the invention, in a more compact configuration than previously available in the art.

FIG. 10 provides a partially cutaway perspective view of the beverage concentrate receptacle 56. The beverage concentrate receptacle 58 is desirably of identical construction as beverage concentrate receptacle 56. As described earlier, the upper shell 56U, the lower shell 56L, the clamp 112, the bolt 114, and the O ring 110 of the beverage concentrate receptacles 56 and 58 are preferably identical to the corresponding structures of the carbonation receptacle 60.

In FIG. 10, the beverage concentrate level can be observed within the beverage concentrate receptacle 56. The gas transfer assembly 90 is connected to a port 120 provided on the upper shell 56U. The pressure relief and gas shut off valve 97 is positioned on the gas transfer assembly 90 over the port 120 and operates as described earlier in connection with the carbonation receptacle 60 in FIG. 9.

The beverage concentrate line 56A, which functions to convey the beverage concentrate to the beverage dispensing head 66, exits the beverage concentrate receptacle 56 through another port 118. Still another port 122 is not used to convey beverage concentrate and is sealed as shown in FIGS. 11A and 11B.

The pressure of the carbon dioxide gas transferred to the interior of the beverage concentrate receptacle 56 forces the beverage concentrate through the beverage concentrate line 56A to the beverage dispensing head 66 where it is dispensed with carbonated water upon the demand of the user.

The beverage concentrate receptacles 56 and 58 can be readily refilled with a beverage concentrate. A fill funnel, generally designated at 124, is inserted into a fill port 116 provided at the top of the upper shell 56U. When refilling is necessary, a user depresses the pressure relief and gas shutoff valve 97 (desirably, the pressure relief and gas shut off valve must be depressed to insert the fill funnel 124) to shut off the pressure from the gas transfer assembly 90 and to release any pressure within the beverage concentrate receptacle 56.

Referring next to FIG. 11A, the fill funnel 124 is provided with a neck portion 124A whose diameter matches the inner diameter of the fill port 116 A key 130B is provided on the inner diameter of the fill port 116. A corresponding key way 130A is provided on the fill funnel neck 124A The key 130B and the key way 130A require that the funnel 124 be inserted into the fill port 116 only in the desired direction.

As represented in FIGS. 11A and 11B, a fill port stopper 126 is provided to normally seal the fill port 116. A spring 128 is mounted on a bracket 127 is included to bias the fill port stopper 126 into the closed position. The bracket 127 is inserted into the port 122. The fill port stopper 126 is desirably provided with a gasket or other structures known in the art to better seal the fill port 116

The hemispherical shape of the fill port stopper 126 ensures that when closed, the fill port stopper 126 will be centered in the fill port 116. The funnel opening, generally designated at 124B, is angled so that as the beverage concentrate passes therethrough, it is directed toward the inner wall of the beverage concentrate receptacle 56 and away from the fill port stopper 126. In this way, fouling of the fill port stopper 126 and the spring 128 with beverage concentrate is avoided.

Figure 12:
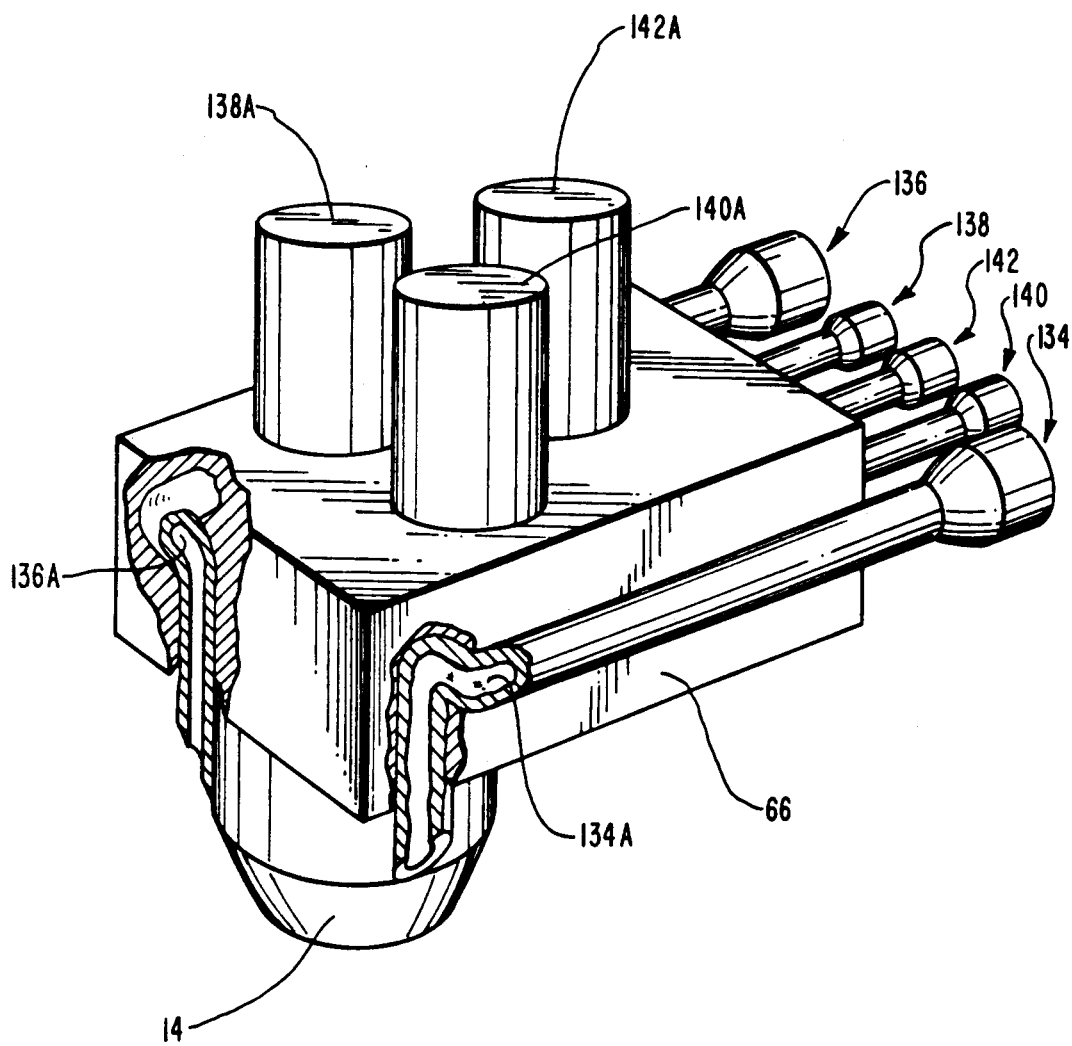
FIG. 12 is a perspective view of the beverage dispensing head included in the described embodiment.

Referring next to FIG. 12, a detailed view of the beverage dispensing head 66 is provided. The beverage dispensing head 66 includes three inlets generally designated at 138, 142, and 140. Three corresponding solenoid valves 138A, 142A, and 140A are also provided. The beverage dispensing head 66 is fabricated by modifying a three way assembly (including the three inlets 138, 142, and 140, the three solenoid valves 138A, 142A, and 140A, as well as the beverage dispensing station 14), which is known in the industry, to include a cold water inlet 136 and a hot water inlet 134.

Still referring to FIG. 12, channels 136A and 134A are formed to convey the water to the beverage dispensing station 14 or nozzle. In this way, five beverages can be dispensed from one beverage dispensing nozzle or beverage dispensing station. While this feature is unneeded in the prior art, where the size of the beverage dispensing apparatus is generally not a consideration, it is an important feature of the present invention which allows the apparatus of the present invention to be as compact as possible.

In view of the forgoing, it will be appreciated that the present invention provides a beverage dispensing apparatus which can reliably and efficiently dispense a variety of beverages in a compact apparatus. The present invention also provides a beverage dispensing apparatus which includes structures to purify and chill culinary water and prevent microorganisms from growing in the chilled, purified water and to dispense a plurality of beverages mixed using the purified, chilled water.

The present invention also provides a beverage dispensing apparatus which can dispense a variety of hot and cold beverages from a single beverage dispensing station and which includes structures to chill both a storage tank of water and a plurality of beverage concentrate containers. The apparatus of the present invention also provides easily refillable beverage concentrate containers. Even further, the present [2] invention to provides a beverage dispensing apparatus wherein the beverage dispensed to the user is always at the correct temperature and the apparatus can be installed in any number of locations either as a stand-alone unit or a built-in unit.

The present invention provides the further advantages that the beverage concentrates stored therein are kept in a fresh state for long periods and the apparatus of the present invention can be routinely maintained by a user without any extraordinary training.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A compact apparatus for dispensing beverages comprising:
   first means for dispensing hot water at a beverage dispensing station;
   second means for dispensing chilled water at the beverage dispensing station; and
   third means for dispensing carbonated water at the beverage dispensing station such that a user can immediately fill a container with hot, chilled, or carbonated water from the compact apparatus without moving the container from the beverage dispensing station.

2. An apparatus for dispensing beverages as defined in claim 1 further comprising:
   means for receiving culinary water from an external source;
   means for purifying the culinary water received from an external source, the means for purifying the culinary water being connected to the means for dispensing hot water, the means for dispensing chilled water, and the means for dispensing carbonated water such that purified water is always dispensed at the beverage dispensing station.

3. An apparatus for dispensing beverages as defined in claim 2 wherein the means for purifying the culinary water comprises:
   a sediment filter;
   a carbon filter; and
   a reverse osmosis device, all serially connected.

4. An apparatus for dispensing beverages as defined in claim 2 further comprising:
   means for holding water;
   means for conveying the water to the means for dispensing hot water, the means for dispensing chilled water, and the means for dispensing carbonated water; and means for inhibiting the growth of microorganisms in the means for holding water.

5. An apparatus for dispensing beverages as defined in claim 4 wherein the means for conveying the water comprises a plurality of water lines, the water lines being oriented such that after a beverage has been dispensed, substantially all of the water flows back to the means for holding a quantity of water.

6. An apparatus for dispensing beverages as defined in claim 4 wherein the means for inhibiting the growth of microorganisms comprises an ultraviolet lamp positioned in the means for holding water.

7. An apparatus for dispensing beverages as defined in claim 4 further comprising:
  fourth means for dispensing carbonated water at the beverage dispensing station, the fourth means for dispensing carbonated water comprising:
    a first beverage storage receptacle, the first beverage storage receptacle being configured to hold a first beverage concentrate, the first beverage storage receptacle being positioned in the means for holding water such that at least a portion of the first beverage storage receptacle is normally at least partially submerged into the water contained in the means for holding water; and
    means for mixing the first beverage concentrate with carbonated water;
  fifth means for dispensing carbonated water at the beverage dispensing station, the fifth means for dispensing carbonated water comprising:
    a second beverage storage receptacle, the second beverage storage receptacle being configured to hold a second beverage concentrate, the second beverage storage receptacle being positioned in the means for holding water such that at least a portion of the second beverage storage receptacle is normally at least partially submerged into the water contained in the means for holding water;
    second means for mixing the second beverage concentrate with carbonated water; and
  means for chilling the water contained in the means for holding water such that the water is kept at a chilled temperature.

8. An apparatus for dispensing beverages as defined in claim 7 wherein the means for holding comprises a holding tank and wherein the means for chilling the water comprises:
  a condensing coil;
  a refrigeration compressor; and
  an evaporation coil mounted adjacent to at least one side of the holding tank, the evaporation coil, compressor and the condensing coil being operated such that an ice bank is substantially continually maintained on at least a portion of the interior of the holding tank.

9. An apparatus for dispensing beverages as defined in claim 4 wherein the means for dispensing carbonated water comprises:
  a carbon dioxide container;
  a carbonation receptacle, the carbonation receptacle being configured to receive water from the holding means and carbon dioxide gas from the carbon dioxide container and mixing the two to obtain carbonated water within the carbonation receptacle, the carbonation receptacle being positioned within the holding means such that the carbonation receptacle is normally at least partially submerged into the water contained in the means for holding water.

10. An apparatus for dispensing beverages as defined in claim 9 further comprising means for communicating carbon dioxide gas present in the carbonation receptacle to the interior of the first beverage receptacle and to the interior of the second beverage receptacle.

11. An apparatus for dispensing beverages as defined in claim 9 wherein the first and the second beverage receptacles and the carbonation receptacle each comprise:
  a first shell portion;
  a second shell portion; and
  means for joining the first shell portion to the second shell portion, the means for joining comprising a resilient seal configured to be placed between the first shell portion and the second shell portion when joined together.

12. An apparatus for dispensing beverages as defined in claim 1 further comprising:
  fourth means for dispensing carbonated water at the beverage dispensing station, the fourth means for dispensing carbonated water comprising means for mixing a first flavored beverage concentrate with carbonated water; and
  fifth means for dispensing carbonated water at the beverage dispensing station, the fifth means for dispensing carbonated water comprising means for mixing a second flavored beverage concentrate with carbonated water.

13. An apparatus for dispensing beverages as defined in claim 12 wherein the first flavored beverage concentrate comprises a soft drink concentrate and the second flavored beverage concentrate comprises a fruit juice concentrate.

14. An apparatus for dispensing beverages as defined in claim 1 further comprising:
  means for holding water and for communicating the water to the means for dispensing hot water, means for dispensing chilled water, and means for dispensing carbonated water; and
  means for inhibiting the growth of microorganisms in the means for holding water.

15. An apparatus for dispensing beverages as defined in claim 14 wherein the means for inhibiting the growth of microorganisms comprises an ultraviolet lamp positioned in the means for holding water.

16. An apparatus for dispensing beverages as defined in claim 14 further comprising:
  fourth means for dispensing carbonated water at the beverage dispensing station, the fourth means for dispensing carbonated water comprising:
    a first beverage storage receptacle, the first beverage storage receptacle being configured to hold a first beverage concentrate, the first beverage storage receptacle being positioned in the means for holding water such that at least a portion of the first beverage storage receptacle is normally at least partially submerged into the water contained in the means for holding water; and
    means for mixing the first beverage concentrate with carbonated water;
  fifth means for dispensing carbonated water at the beverage dispensing station, the fifth means for dispensing carbonated water comprising:
    a second beverage storage receptacle, the second beverage storage receptacle being configured to hold a second beverage concentrate, the second beverage storage receptacle being positioned in the means for holding water such that at least a portion of the second beverage storage receptacle is normally at least partially submerged into the water contained in the means for holding water;

second means for mixing the second beverage concentrate with carbonated water; and means for chilling the water contained in the means for holding water such that the water is kept at a chilled temperature.

17. An apparatus for dispensing beverages as defined in claim 16 wherein the means for holding comprises a holding wherein the means for chilling the water comprises:

a condensing coil;

a refrigeration compressor; and an expansion coil mounted adjacent to at least one side of the holding tank, the expansion coil, compressor and the condensing coil being operated such that an ice bank is substantially continually maintained on at least a portion of the interior of the holding tank.

18. An apparatus for dispensing beverages as defined in claim 16 wherein the means for dispensing carbonated water comprises:

a carbon dioxide container;

a carbonation receptacle, the carbonation receptacle being configured to receive water from the holding means and carbon dioxide gas from the carbon dioxide container and mixing the two to obtain carbonated water within the carbonation receptacle, the carbonation receptacle being positioned within the holding means such that the carbonation receptacle is normally at least partially submerged into the water contained in the means for holding water.

19. An apparatus for dispensing beverages as defined in claim 18 further comprising means for communicating carbon dioxide gas present in the carbonation receptacle to the interior of the first beverage receptacle and to the interior of the second beverage receptacle.

20. An apparatus for dispensing beverages as defined in claim 18 wherein the first and the second beverage receptacles and the carbonation receptacle each comprise:

a first body portion;

a second body portion; and means for joining the first body portion to the second body portion, the means for joining comprising a resilient seal configured to be placed between the first body portion and the second body portion when joined together.

21. An apparatus for dispensing beverages as defined in claim 1 further comprising:

fourth means for dispensing carbonated water at the beverage dispensing station, the fourth means for dispensing carbonated water comprising means for mixing a first flavored beverage concentrate with carbonated water; and fifth means for dispensing carbonated water at the beverage dispensing station, the fifth means for dispensing carbonated water comprising means for mixing a second flavored beverage concentrate with carbonated water.

22. An apparatus for dispensing beverages as defined in claim 21 wherein the first flavored beverage concentrate comprises a soft drink concentrate and the second flavored beverage concentrate comprises a fruit juice concentrate.

23. An apparatus for dispensing beverages as defined in claim 1 wherein the first means for dispensing hot water comprises:

a water heater; and a fluid line between the water heater and the beverage dispensing station, the fluid line being oriented such that any water in the fluid line tends to drain back to the water heater; and a pump connected to the water heater and configured to move the water through the fluid line and out the beverage dispensing station.

24. An apparatus for dispensing beverages as defined in claim 1 wherein the first means for dispensing hot water comprises a first switch configured to be user activated when hot water is desired; wherein the second means for dispensing chilled water comprises a second switch configured to be user activated when chilled water is desired; and wherein the third means for dispensing carbonated water comprises a third switch configured to be user activated when carbonated water is desired.

25. A compact apparatus for dispensing a plurality of beverages comprising:

means for receiving water from an external source;

means for purifying the water received from the external source;

means for heating the water treated by the means for purifying the water;

means for chilling the water treated by the means for purifying the water;

means for carbonating the water treated by the means for purifying the water; and means for dispensing at a single dispensing station, the water carbonated by the means for carbonating, the water chilled by the means for chilling, and the means for heating such that a user can obtain hot water, chilled water, and carbonated water on demand from the compact apparatus at the single dispensing station.

26. A compact apparatus for dispensing beverages comprising:

means for receiving water from an external source;

a holding tank which receives the water;

means for chilling the water received into the holding tank;

at least one beverage concentrate storage receptacle, the beverage concentrate storage receptacle positioned in the holding tank and at least partially submerged in the water found in the holding tank such that the temperature of the water is transferred to the beverage concentrate storage receptacle; and means for dispensing the beverage from the beverage concentrate storage receptacle in the compact apparatus to a user at a beverage dispensing station.

27. An apparatus for dispensing beverages as defined in claim 26 further comprising a plurality of beverage storage receptacles, the beverage storage receptacles each position in the holding tank and at least partially submerged in the water found in the holding tank such that the temperature of the water is transferred to the beverage storage receptacles.

28. An apparatus for dispensing beverages as defined in claim 27 further comprising:

means for receiving culinary water from an external source; and means for purifying the culinary water received from an external source.

29. An apparatus for dispensing beverages as defined in claim 28 wherein the means for purifying comprises:
   a sediment filter;
   a carbon filter; and
   a reverse osmosis device.

30. A quickly refillable beverage storage receptacle for use in a compact apparatus for dispensing beverages, the beverage and being used in a compact beverage apparatus storage receptacle comprising:
   a hollow body capable of a holding a liquid beverage;
   a port formed in the body;
   a stopper positioned on the interior of the hollow body, the stopper being hinged such that it can assume a first closed position sealing the port and a second open position away from the port; and
   means for biasing the stopper into the first closed position.

31. A quickly refillable beverage storage receptacle for use in an apparatus for dispensing beverages as defined in claim 30 further comprising
   filler means for guiding a liquid into the hollow body, the filler means being removably positioned in the port when filling of the hollow body is desired, the filler means having a tubular extension through which the liquid flows, the tubular extension and pushing and holding the stopper in the open position, the tubular extension having an opening which directs the flow of the liquid from the tubular extension away from the stopper and into the hollow body such that the stopper does not receive the direct flow of the liquid as it enters the hollow body.

32. A quickly refillable beverage storage receptacle for use in an apparatus for dispensing beverages as defined in claim 31 wherein the filler means comprises a fill funnel.

33. An apparatus for dispensing beverages as defined in claim 30 further comprising a plurality of ports provided in the beverage storage receptacle, at least one of the ports is configured to convey a gas to the interior of the beverage storage receptacle.

34. An apparatus for dispensing beverages as defined in claim 33 further comprising means for releasing any pressure contained in the beverage storage receptacle.

35. An apparatus for dispensing beverages as defined in claim 34, 35 wherein the means for releasing any pressure contained in the beverage storage receptacle comprises a valve removably connected to one of the ports, the valve being configured for allowing gas to enter the hollow body under pressure when in the open position and being configured such that it must assume a closed position before the filler means can be inserted into the port on the receptacle.

36. A compact beverage dispensing apparatus capable of dispensing carbonated beverages using a source of carbon dioxide gas under pressure, the compact beverage dispensing apparatus comprising:
   a carbonation receptacle capable of receiving water and carbon dioxide, causing the absorption of the carbon dioxide by the water, and being used in the compact beverage dispensing apparatus;
   a water inlet provided on the carbonation receptacle;
   a carbonated water outlet provided on the carbonation receptacle;
   a gas inlet provided on the carbonation receptacle, the gas inlet configured to receive the carbon dioxide gas;
   a gas outlet provided on the carbonation receptacle, the gas outlet configured to exhaust the carbon dioxide gas from within the carbonation receptacle;
   a first beverage receptacle, the first beverage receptacle being adapted to receiving a beverage concentrate;
   a first gas inlet provided on the first beverage receptacle;
   means for connecting the gas outlet to the first gas inlet port provided on the first beverage receptacle such that carbon dioxide gas transferred from the carbonation receptacle to the first beverage receptacle and the gas is kept under pressure within the first beverage receptacle.

37. A beverage dispensing apparatus capable of dispensing carbonated beverages using a source of carbon dioxide gas under pressure as defined in claim 36 further comprising:
   a second beverage receptacle;
   a second gas inlet provided on the second beverage receptacle; and
   wherein the means for connecting the gas outlet to the first gas inlet provided on the first beverage receptacle is further for connecting the gas outlet to the second gas inlet provided on the second beverage receptacle and carbon dioxide gas is kept under pressure within the second beverage receptacle.

38. A beverage dispensing apparatus capable of dispensing carbonated beverages using a source of carbon dioxide gas under pressure as defined in claim 37 wherein the first beverage receptacle and the second beverage receptacle each comprise:
   an upper shell;
   a lower shell; and
   a plurality of ports provided on the beverage receptacles, each of the upper shells, lower shells, and the plurality of ports being substantially identically configured such that the upper and lower shells may be used as wither the first receptacle or the second receptacle.

* * * * *